United States Patent
Nagamori et al.

(10) Patent No.: US 8,044,147 B2
(45) Date of Patent: Oct. 25, 2011

(54) NITRILE GROUP-CONTAINING COPOLYMER RUBBER AND A VULCANIZABLE NITRILE GROUP-CONTAINING COPOLYMER RUBBER COMPOSITION

(75) Inventors: Hiroyasu Nagamori, Yokohama (JP); Akira Tsukada, Ichikawa (JP); Takafumi Kawanaka, Yokohama (JP)

(73) Assignee: Zeon Corporation, Tokyo (JP)

( * ) Notice: Subject to any disclaimer, the term of this patent is extended or adjusted under 35 U.S.C. 154(b) by 259 days.

(21) Appl. No.: 11/884,794

(22) PCT Filed: Feb. 22, 2006

(86) PCT No.: PCT/JP2006/303160
§ 371 (c)(1),
(2), (4) Date: Aug. 21, 2007

(87) PCT Pub. No.: WO2006/090734
PCT Pub. Date: Aug. 31, 2006

(65) Prior Publication Data
US 2009/0124741 A1    May 14, 2009

(30) Foreign Application Priority Data

Feb. 23, 2005  (JP) .................................. 2005-046496

(51) Int. Cl.
*C08F 36/00*  (2006.01)
(52) U.S. Cl. ..................... 525/329.3; 524/556; 524/565; 524/571; 525/329.1; 525/332.5; 525/387; 526/319; 526/329.1
(58) Field of Classification Search ............... 525/328.3, 525/329.3, 338, 387, 329.1, 332.5; 526/319, 526/329.1; 524/556, 565, 571
See application file for complete search history.

(56) References Cited

U.S. PATENT DOCUMENTS

| | | | | |
|---|---|---|---|---|
| 4,965,323 A | * | 10/1990 | Watanabe et al. | ............. 525/349 |
| 6,548,604 B1 | | 4/2003 | Kotsuji et al. | |
| 6,812,312 B1 | | 11/2004 | Ito et al. | |

FOREIGN PATENT DOCUMENTS

| | | |
|---|---|---|
| EP | 0 704 459 A1 | 4/1996 |
| EP | 1 243 602 A1 | 9/2002 |
| EP | 1 247 835 A1 | 10/2002 |
| EP | 1 449 873 A1 | 8/2004 |
| JP | 2001-114833 A | 4/2001 |
| JP | 2001-114940 A | 4/2001 |
| JP | 2001-288303 A | 10/2001 |
| JP | 2004-2756 A | 1/2004 |
| JP | 2004-2768 A | 1/2004 |
| WO | WO-01/27171 A1 | 4/2001 |
| WO | WO-01/27199 A1 | 4/2001 |
| WO | WO-03/080681 A1 | 10/2003 |
| WO | WO-03/085008 A1 | 10/2003 |

* cited by examiner

*Primary Examiner* — David W Wu
*Assistant Examiner* — Marie Reddick
(74) *Attorney, Agent, or Firm* — Birch, Stewart, Kolasch & Birch, LLP

(57) ABSTRACT

A nitrile group-containing copolymer rubber comprising 10 to 40 wt % of α,β-ethylenically unsaturated nitrile unit (a), 10 to 60 wt % of α,β-ethylenically unsaturated carboxylic acid ester unit (b), and 20 to 70 wt % in total of conjugated diene unit (c) and saturated conjugated diene unit (d), wherein a content ratio "x" of a conjugated diene unit (c) based on the total content of said conjugated diene unit (c) and said saturated conjugated diene unit (d) is 0.08 or smaller, and "x·A" defined as a product of said ratio "x" and a content ratio "A" (%) of said α,β-ethylenically unsaturated nitrile unit (a) is 1.5 or smaller. According to the present invention, a nitrile group-containing copolymer rubber capable to provide a rubber vulcanizate highly balanced in mechanical strength, heat aging resistance, oil resistance, cold resistance and ozone resistance, and a vulcanizable rubber composition using the rubber can be provided.

12 Claims, No Drawings

NITRILE GROUP-CONTAINING COPOLYMER RUBBER AND A VULCANIZABLE NITRILE GROUP-CONTAINING COPOLYMER RUBBER COMPOSITION

This application is a National Stage of PCT International Application No. PCT/JP2006/303160 filed on Feb. 22, 2006, which designated the United States, and on which priority is claimed under 35 U.S.C. §371, the entire contents of which are hereby incorporated by reference.

TECHNICAL FIELD

The present invention relates to a highly-saturated nitrile group-containing copolymer rubber, specifically a nitrile-group containing copolymer rubber that provides a vulcanizate excellent in balance of fundamental properties.

BACKGROUND ART

A highly saturated nitrile group-containing copolymer rubber, as represented by hydrogenated acrylonitrile-butadiene copolymer rubber, draws attention. The highly saturated nitrile group-containing copolymer rubber is superior in heat resistance, oil resistance, ozone resistance, etc., compared to common nitrile group-containing copolymer rubber having a lot of carbon-carbon unsaturated bonds in a main chain structure such as acrylonitrile-butadiene copolymer rubber. However, depending on an amount of nitrile group and content of unsaturated bonds in carbon-carbon bonds, it is liable to be inferior in cold resistance compared to a nitrile group-containing copolymer rubber having a lot of carbon-carbon unsaturated bonds. Generally, cold resistance of the nitrile group-containing copolymer rubber can be enhanced by reducing an amount of nitrile group, but when increasing a degree of saturation in a nitrile group-containing copolymer rubber, cold resistance is not always improved by reducing an amount of nitrile group.

It is continuously required to further advance overall performance such as mechanical strength, heat aging resistance, oil resistance, cold resistance and ozone resistance in many fields including car parts. Therefore, it is required to improve cold resistance of highly-saturated nitrile group-containing copolymer rubber.

To solve this problem, Patent Document 1 proposes a highly-saturated nitrile group-containing copolymer rubber, wherein each of $\alpha,\beta$-ethylenically unsaturated nitrile unit (a), $\alpha,\beta$-ethylenically unsaturated carboxylic acid ester unit (b), conjugated diene unit (c) and saturated conjugated diene unit (d) is included in a specific ratio, and a total ratio of the (c) and (d) and the ratio of the (d) based on the total ratio are set within a specific range, and the difference between the extrapolated glass transition initiating temperature (Tig) and extrapolated glass transition-ending temperature (Teg) is 10° C. or lower. However, while vulcanizate obtained by vulcanizing this rubber can be improved in cold resistance, oil resistance, dynamic characteristics, etc., heat resistance and ozone resistance may be insufficient.

[Patent Article 1] The Japanese Unexamined Patent Publication (A) No. 2001-114940

DISCLOSURE OF THE INVENTION

Problem to be Solved by the Invention

An object of the invention is to provide a nitrile group-containing copolymer rubber capable to provide a rubber vulcanizate highly balanced in mechanical strength, heat aging resistance, oil resistance, cold resistance and ozone resistance, and vulcanizable rubber composition using the rubber.

Means for Solving the Problem

The present inventors engaged in intensive research to resolve the above problems and as a result discovered that a vulcanizate highly balanced in each of the above properties can be obtained by setting a specific relationship between a content ratio of conjugated diene unit and saturated conjugated diene unit and a content ratio of $\alpha,\beta$-ethylenically unsaturated nitrile unit in a nitrile group-containing copolymer rubber including respective specific ratios of $\alpha,\beta$-ethylenically unsaturated nitrile unit, $\alpha,\beta$-ethylenically unsaturated carboxylic acid ester unit, conjugated diene unit and saturated conjugated diene unit, and by vulcanizing this nitrile group-containing copolymer rubber with a vulcanizing agent (preferably an organic peroxide), and attained the present invention based on the findings.

Thus, according to the present invention, there is provided a nitrile group-containing copolymer rubber comprising 10 to 40 wt % of $\alpha,\beta$-ethylenically unsaturated nitrile unit (a), 10 to 60 wt % of $\alpha,\beta$-ethylenically unsaturated carboxylic acid ester unit (b), and 20 to 70 wt % in total of conjugated diene unit (c) and saturated conjugated diene unit (d), wherein a content ratio "x" of the conjugated diene unit (c) based on the total content of the conjugated diene unit (c) and the saturated conjugated diene unit (d) is 0.08 or smaller, and "x·A" defined as a product of the ratio "x" and a content ratio "A" (%) of the $\alpha,\beta$-ethylenically unsaturated nitrile unit (a) is 1.5 or smaller.

In the nitrile group-containing copolymer rubber of the present invention, a monomer forming the $\alpha,\beta$-ethylenically unsaturated nitrile unit (a) is preferably an acrylonitrile and/or a methacrylonitrile.

Preferably, a monomer forming the $\alpha,\beta$-ethylenically unsaturated carboxylic acid ester unit (b) is a butyl acrylate and/or 2-ethylhexyl acrylate.

Preferably, a monomer forming the conjugated diene unit (c) is a 1,3-butadiene.

Preferably, the saturated conjugated diene unit (d) is a monomer unit formed by hydrogenating the 1,3-butadiene.

Also, according to the present invention, there is provided a vulcanizable nitrile group-containing copolymer rubber composition including the above nitrile group-containing copolymer rubber and a vulcanizing agent.

In the vulcanizable nitrile group-containing copolymer rubber composition of the present invention, an amount of the vulcanizing agent is preferably 0.1 to 10 parts by weight based on 100 parts by weight of the nitrile group-containing copolymer rubber.

Preferably, the vulcanizing agent is an organic peroxide.

Further, according to the present invention, there is provided a rubber vulcanizate formed by vulcanizing any one of the above vulcanizable nitrile group-containing copolymer rubber composition.

Effects of the Invention

According to the present invention, there is provided a nitrile group-containing copolymer rubber capable to give a rubber vulcanizate highly balanced in mechanical strength, heat aging resistance, oil resistance, cold resistance and ozone resistance, and vulcanizable rubber composition using the rubber.

BEST MODE FOR CARRYING OUT THE INVENTION

The nitrile group-containing copolymer rubber of the present invention is characterized by comprising 10 to 40 wt % of α,β-ethylenically unsaturated nitrile unit (a), 10 to 60 wt % of α,β-ethylenically unsaturated carboxylic acid ester unit (b), and 20 to 70 wt % in total of conjugated diene unit (c) and saturated conjugated diene unit (d), wherein a content ratio "x" of a conjugated diene unit (c) based on a total content of the conjugated diene unit (c) and the saturated conjugated diene unit (d) is 0.08 or smaller, and "x·A" defined as a product of the ratio "x" and a content ratio "A" (%) of the α,β-ethylenically unsaturated nitrile unit (a) is 1.5 or smaller.

Also, the vulcanizable nitrile group-containing copolymer rubber composition of the present invention comprises the nitrile group-containing copolymer rubber and a vulcanizing agent.

Below, the nitrile group-containing copolymer rubber and the vulcanizable nitrile group-containing copolymer rubber composition of the present invention will be explained in detail.

Nitrile Group-Containing Copolymer Rubber

α,β-ethylenically unsaturated nitrile to constitute α,β-ethylenically unsaturated nitrile unit (a) is not limited as far as it is an α,β-ethylenically unsaturated compound having a nitrile group. Examples of α,β-ethylenically unsaturated nitrile include acrylonitrile; α-halogenoacrylonitriles such as α-chloroacrylonitrile and α-bromoacrylonitrile; α-alkylacrylonitriles such as methacrylonitrile. Among these, acrylonitrile and methacrylonitrile are preferable. For α,β-ethylenically unsaturated nitrile, a plurality of these can be used together.

The content ratio A (%) of the α,β-ethylenically unsaturated nitrile unit (a) of the nitrile group-containing copolymer rubber of the present invention is 10 to 40 wt %, preferably 12 to 38 wt % and more preferably 15 to 35 wt %. If the content ratio A (%) of the α,β-ethylenically unsaturated nitrile unit (a) is too small, the resulting vulcanizate is liable to deteriorate in oil resistance, and conversely, if too large, the cold resistance may be reduced.

α,β-ethylenically unsaturated carboxylic acid ester to constitute α,β-ethylenically unsaturated carboxylic acid ester unit (b) is not limited as far as it is α,β-ethylenically unsaturated monocarboxylic acid ester, or monoester or polyester of α,β-ethylenically unsaturated polycarboxylic acid. Examples of α,β-ethylenically unsaturated carboxylic acid ester include (meth)acrylates having an alkyl group with carbon number of 1 to 18 such as methyl (meth)acrylate [methyl (meth)acrylate means "methyl acrylate" or "methyl methacrylate", same for ethyl (meth)acrylate, etc.], ethyl (meth)acrylate, butyl (meth)acrylate, n-dodecyl (meth)acrylate and 2-ethylhexyl acrylate; (meth)acrylates having an alkoxyalkyl group with carbon number of 2 to 18 such as methoxymethyl (meth)acrylate and methoxyethyl (meth)acrylate; (meth)acrylates having a cyanoalkyl group with carbon number of 2 to 18 such as 1-cyanoethyl (meth)acrylate and 2-cyanoethyl (meth)acrylate; (meth)acrylates having a hydroxyalkyl group with carbon number of 1 to 18 such as 2-hydroxyethyl (meth)acrylate and 2-hydroxypropyl (meth)acrylate; (meth)acrylates having an alkyl group-containing aminoalkyl group with carbon number of 1 to 18 such as dimethylaminomethyl (meth)acrylate and diethylaminoethyl (meth)acrylate; (meth)acrylates having a fluoroalkyl group with carbon number of 1 to 18 such as trifluoroethyl (meth)acrylate and tetrafluoropropyl (meth)acrylate; fluorine-substituted benzyl (meth)acrylates such as fluorobenzyl (meth)acrylate; unsaturated dicarboxylic acid monoalkyl esters or unsaturated dicarboxylic acid dialkyl esters having an alkyl group with carbon number of 1 to 18 such as monoethyl maleate, dimethyl maleate, dimethyl fumarate, dimethyl itaconate, n-butyl itaconate and diethyl itaconate. Among these, (meth)acrylates having an alkyl group are preferable, butyl acrylate and 2-ethylhexyl acrylate are more preferable, and butyl acrylate is particularly preferable.

The content ratio of α,β-ethylenically unsaturated carboxylic acid ester unit (b) in the nitrile group-containing copolymer rubber of the present invention is 10 to 60 wt %, preferably 15 to 55 wt % and more preferably 20 to 45 wt %. When the content ratio of α,β-ethylenically unsaturated carboxylic acid ester unit (b) is too small, cold resistance in the resulting vulcanizate is liable to decline. In contrast, when too large, oil resistance and dynamic characteristics may be reduced.

The conjugated diene to constitute conjugated diene unit (c) is not limited as far as it is a conjugated diene compound copolymerizable with α,β-ethylenically unsaturated nitrile and α,β-ethylenically unsaturated carboxylic acid ester. Preferred examples of conjugated diene include conjugated diene-containing compounds with carbon number of 4 to 12 such as 1,3-butadiene, isoprene, 2,3-dimethyl-1,3-butadiene and 1,3-pentadiene. Among these, 1,3-butadiene is preferable.

A saturated conjugated diene unit (d) included in the nitrile group-containing copolymer rubber of the present invention is such structural unit that carbon-carbon double bonds in a conjugated diene unit have been saturated by hydrogenation. Namely, the saturated conjugated diene unit (d) is a monomeric unit formed by hydrogenating conjugated diene units included in the nitrile group-containing copolymer rubber before hydrogenation. Therefore, the conjugated diene unit (c) indicates remaining conjugated diene unit excluding the saturated conjugated diene unit (d) formed by hydrogenation from conjugated diene units included in the nitrile group-containing copolymer rubber before hydrogenation.

The total content ratio of the conjugated diene unit (c) and the saturated conjugated diene unit (d) in the nitrile group-containing copolymer rubber of the present invention is 20 to 70 wt %, preferably 25 to 65 wt %, and more preferably 35 to 60 wt %. When the total content ratio of the conjugated diene unit (c) and the saturated conjugated diene unit (d) is too small, dynamic characteristics of the resulting vulcanizate is liable to decline. Conversely, when too large, oil resistance may be reduced.

The content ratio "x" [i.e., x="a content of (c)"/("a content of (c)"+"a content of (d)")] of the conjugated diene unit (c) based on the total content of the conjugated diene unit (c) and the saturated conjugated diene unit (d) in the nitrile group-containing copolymer rubber of the present invention is 0.08 or smaller, preferably 0.07 or smaller, and more preferably 0.05 or smaller. When the ratio "x" is too large, heat aging resistance and ozone resistance in the resulting vulcanizate are liable to decline.

"x·A" defined as a product of the content ratio "x" of the conjugated diene unit (c) based on the total content of the conjugated diene unit (c) and the saturated conjugated diene unit (d) in the nitrile group-containing copolymer rubber of the present invention and a content ratio "A" (%) of the α,β-ethylenically unsaturated nitrile unit (a) is 1.5 or smaller, preferably 1.4 or smaller, more preferably 1.2 or smaller, and particularly preferably 1.1 or smaller. When the product "x·A" is too large, heat aging resistance in the resulting vulcanizate is liable to decline.

Also, the nitrile group-containing copolymer rubber of the present invention may furthermore include other monomers copolymerizable with an α,β-ethylenically unsaturated nitrile and a conjugated diene in a monomer-containing rate based on all monomeric units of usually 30 wt % or smaller, preferably 10 wt % or smaller and more preferably 5 wt % or smaller.

As such other monomers, nonconjugated diene, α-olefin, aromatic vinyl, fluorine-containing vinyl, α,β-ethylenically unsaturated monocarboxylic acid, α,β-ethylenically unsaturated polycarboxylic acid, cross-linkable monomer, copolymerizable antioxidant, etc. may be mentioned.

The nonconjugated dienes are preferably those with carbon number of 5 to 12, and the examples thereof include 1,4-pentadiene, 1,4-hexadiene, vinylnorbornene, dicyclopentadiene, etc.

The α-olefins are preferably those with carbon number of 2 to 12, and the examples thereof include ethylene, propylene, 1-butene, 4-methyl-1-pentene, 1-hexene, 1-octene, etc.

As the aromatic vinyl, for example, styrene, α-methylstyrene, vinylpyridine, etc. may be mentioned.

As the fluorine-containing vinyl, for example, fluoroethylvinyl ether, fluoropropylvinyl ether, o-tri-fluoromethylstyrene, vinyl pentafluorobenzoate, difluoroethylene, tetrafluoroethylene, etc. may be mentioned.

As the α,β-ethylenically unsaturated monocarboxylic acid, for example, acrylic acid, methacrylic acid, crotonic acid, cinnamic acid, etc. may be mentioned.

As the α,β-ethylenically unsaturated polycarboxylic acid, for example, maleic acid, fumaric acid, itaconic acid, etc. may be mentioned.

As the cross-linkable monomer, in addition to polyfunctional ethylenic unsaturated monomers including divinyl compounds such as divinylbenzene; di(meth)acrylic acid esters such as ethylene di(meth)acrylate, diethylene glycol di(meth)acrylate and ethylene glycol di(meth)acrylate; tri(meth)acrylic acid esters such as trimethylolpropane tri(meth)acrylate; selfcross-linkable monomers such as N-methylol (meth)acrylamide and N,N'-dimethylol (meth) acrylamide.

As the copolymerizable antioxidant, for example, N-(4-anilinophenyl)acrylamide, N-(4-anilinophenyl) methacrylamide, N-(4-anilinophenyl)cinnamamide, N-(4-anilinophenyl)crotonamide, N-phenyl-4-(3-vinylbenzyloxy) aniline, N-phenyl-4-(4-vinylbenzyloxy) aniline etc. may be mentioned.

Here, respective content ratios of α,β-ethylenically unsaturated nitrile unit (a), α,β-ethylenically unsaturated carboxylic acid ester unit (b), conjugated diene unit (c) and saturated conjugated diene unit (d) in the nitrile group-containing copolymer rubber can be determined by the following method for example. Namely, by employing a combination of plural methods such as nitrogen content-determination by semi-micro Kjeldahl method, unsaturation content-determination by infrared absorption spectroscopy or iodine value determination, and identification of partial structures and content ratio determination by infrared absorption spectroscopy, $^1$H-NMR, $^{13}$C-NMR and pyrolysis gas chromatography, the content ratio of each monomer unit can be obtained. Identification of partial structures and content ratio determination by $^1$H-NMR are generally most reliable, but a plurality of peaks in a $^1$H-NMR chart occasionally coincides with each other, which makes the determination difficult. Therefore, analysis by a combination of $^1$H-NMR with other methods is preferable in such a case.

In the nitrile group-containing copolymer rubber of the present invention, a composition distribution breadth of content ratios of the above (a), (b), and [(c) and (d)] is preferably not larger than 20 wt %, more preferably not larger than 15 wt % and especially preferably not larger than 10 wt %. When these composition distribution breadths are within the above range, the resulting vulcanizate is highly superior in the balance of cold resistance, oil resistance and dynamic characteristics. Note that the composition distribution breadth in content ratios of the above (a), (b) and [(c) and (d)] indicates a ratio of [a difference between the maximum value and the minimum value of content ratios on minute sections of a polymer] to [content ratios in the total polymer] as stated in the Japanese Patent Publication (A) No. 2001-114940 (U.S. Pat. No. 6,548,604, B1 Publication).

A production method of the nitrile group-containing copolymer rubber of the present invention is not particularly limited. Generally, α,β-ethylenically unsaturated nitrile, α,β-ethylenically unsaturated carboxylic acid ester, conjugated diene and other optionally added monomers copolymerizable with the above monomers are first copolymerized each other. Then, the conjugated diene unit in the resulting copolymer rubber is selectively hydrogenated to produce a nitrile group-containing copolymer rubber. Such a method is useful and preferable.

A reaction condition of copolymerization for obtaining the nitrile group-containing copolymer rubber having the target composition distribution breadth is not particularly limited. A monomer may be added during the course of polymerization reaction. Copolymerization conditions can be determined according to the known methods.

If hydrogenation of nitrile group occurs during the hydrogenation reaction for the copolymer obtained by copolymerization to hydrogenate the conjugated diene unit, oil resistance of the resulting vulcanizate is reduced. Therefore, it is necessary to selectively hydrogenate carbon-carbon double bonds only. Such method for selective hydrogenation is not particularly limited, and may apply any known methods.

The nitrile group-containing copolymer rubber of the present invention, obtained by hydrogenation, preferably has a number average molecular weight (Mn) of 10,000 to 2,000,000, more preferably 30,000 to 1,500,000 and especially preferably 50,000 to 1,000,000. When Mn is too small, the resulting vulcanizate is liable to be inferior in mechanical strength such as tensile strength. In contrast, when Mn is too large, the rubber composition may have poor processability.

Vulcanizable Nitrile Group-Containing Rubber Composition

A vulcanizable nitrile group-containing rubber composition of the present invention is formed by adding a vulcanizing agent as an essential component to the above nitrile group-containing copolymer rubber.

The vulcanizing agent used in the present invention is not particularly limited provided that it is capable of crosslinking the nitrile group-containing copolymer rubber of the present invention, and an organic peroxide is preferable.

As the organic peroxide, those used as a vulcanizing agent in rubber industry are preferable, including dialkyl peroxides, diacyl peroxides and peroxyesters, etc. Among these, dialkyl peroxides are preferable.

As dialkyl peroxides, dicumyl peroxide, di-tert-butyl peroxide, 2,5-dimethyl-2,5-di(tert-butyl-peroxy)-3-hexyne, 2,5-dimethyl-2,5-di(tert-butyl-peroxy)hexane and 1,3-bis(tert-butyl-peroxyisopropyl)benzene, etc. may be mentioned.

As diacyl peroxides, benzoyl peroxide, isobutyryl peroxide, etc. may be mentioned.

As peroxy esters, 2,5-dimethyl-2,5-bis(benzoyl-peroxy) hexane, tert-butyl-peroxyisopropyl carbonate, etc. may be mentioned.

The amount of the vulcanizing agent is preferably 0.1 to 10 parts by weight, more preferably 0.5 to 8 parts by weight and furthermore preferably 1 to 6 parts by weight based on 100 parts by weight of the nitrile group-containing copolymer rubber. Particularly when using an organic peroxide as the vulcanizing agent, the amount is preferably within the above range. When the amount of the vulcanizing agent is too small, crosslinking density of the resulting vulcanizate may be reduced, so that compression set is liable to be enhanced. In contrast, when the amount is too large, rubber elasticity may be insufficient.

As a vulcanizing accelerator usable with the organic peroxide, triallyl cyanurate, triallyl isocyanurate, trimethylolpropane trimethacrylate, N,N'-m-phenylenebismaleimide, diacryl phthalate, 1,2-polybutadiene, ethylene glycol dimethacrylate, etc. may be preferably mentioned. These vulcanizing accelerators may be used either alone or as a combination of two or more thereof.

In the vulcanizable nitrile group-containing rubber composition of the present invention, various ingredients conventionally used in rubber industry, e.g., a reinforcing filler such as carbon black or silica, a non-reinforcing filler such as calcium carbonate or clay, a processing aid, a plasticizer, an antioxidant, an antiozonant and a colorant, etc., can be incorporated in addition to the above nitrile group-containing copolymer rubber, the vulcanizing agent, and the vulcanizing accelerator used in accordance with need. The amount of these ingredients is not particularly limited provided that the object and effect of the present invention can be achieved, and suitable amounts can be appropriately chosen depending upon the particular use of ingredients.

Also, in the vulcanizable nitrile group-containing rubber composition of the present invention, various rubbers, other than the nitrile group-containing copolymer rubber of the present invention, can be incorporated. Other rubbers used are not particularly limited. However, when a nitrile group-containing copolymer rubber having a high degree of unsaturation such as the conventional acrylonitrile-butadiene copolymer rubber is incorporated, its amount should be not larger than 30 parts by weight, preferably not larger than 20 parts by weight and more preferably not larger than 10 parts by weight, based on 100 parts by weight of the nitrile group-containing copolymer rubber of the present invention. When the amount of a nitrile group-containing copolymer rubber having a high degree of unsaturation is too large, effects of the present invention may be deteriorated, so that the resulting crosslinked rubber product does not show expected characteristics to be hereinafter described.

The procedure for preparing the nitrile group-containing copolymer rubber composition of the present invention is not limited, and the rubber composition can be usually prepared by primary kneading of all ingredient except for a vulcanizing agent and a part of heat-unstable vulcanizing accelerators with a mixer such as Banbury mixer, Intermixer, and kneader, followed by secondary kneading after transferring into a roll, etc. and adding the vulcanizing agent, etc.

Vulcanizate

A vulcanizate of the present invention can be obtained by molding and vulcanizing the vulcanizable nitrile group-containing rubber composition of the present invention.

Specifically, by using a molding machine suitable for forming an intended shape such as an extruder, an injection molder, a compression machine and a roll, the above mentioned vulcanizable nitrile group-containing copolymer rubber composition is molded and subjected to vulcanization to thereby fix the shape. In this case, vulcanization can be performed either after molding or at the same time of molding.

The molding temperature is usually 10 to 200° C. and preferably 25 to 120° C. The vulcanizing temperature is usually 100 to 200° C. and preferably 130 to 190° C., and the vulcanizing time is usually 1 minute to 24 hours and preferably 2 minutes to 1 hour.

Depending on the shape and size of the rubber vulcanizate, its inside may not be sufficiently vulcanized even when its surface is vulcanized, so that secondary vulcanization may be performed by further heating.

Since the rubber vulcanizate of the present invention is highly balanced in mechanical strength, heat aging resistance, oil resistance, cold resistance and ozone resistance, it is suitable to use as rubber materials for vibration insulators, hoses and window frames as well as dynamic parts such as belts, diaphragms, shoe soles and automobile parts.

EXAMPLES

Below, examples and comparative examples will be given so that the present invention will be more specifically explained. Note that the present invention is not limited to the examples. In the following, "parts" and "%" are based on weight unless otherwise indicated.

Tests and evaluations were performed as below.

(1) Normal Physical Properties (Tensile Strength & Elongation)

A vulcanizable nitrile group-containing copolymer rubber composition was inserted in a metal mold with a length of 15 cm, a width of 15 cm and a thickness of 0.2 cm, and press molded at 170° C. for 20 minutes while applying pressure to obtain a sheet-shaped rubber vulcanizate. The obtained sheet-shaped rubber vulcanizate was punched out with a dumbbell no. 3 to produce a specimen. Using the obtained specimen, tensile strength and elongation of the rubber vulcanizate were measured according to Japanese Industrial Standard (JIS) K 6251.

(2) Normal Physical Property (Hardness)

For the sheet-shaped rubber vulcanizate obtained by the method mentioned above in (1), hardness of the vulcanizate was measured by using a durometer hardness tester, type A, according to JIS K 6253.

(3) Heat Aging Resistance (Hot-Air Aging Test)

The specimen produced by the method mentioned above in (1) was first placed at 150° C. for 504 hours, according to the normal oven method of JIS K 6257. Elongation was then measured by the method mentioned above in (1) to determine the change in % of the elongation after the hot-air aging test from that in (1), so that heat aging resistance was evaluated.

(4) Oil Resistance

A specimen with the volume and the thickness defined in JIS K 6258 was produced by punching out with a dumbbell. According to JIS K 6258, after the specimen was immersed in commercial engine oil (HONDA ULTRA MILD SL by Honda Motor Co., Ltd.) at 150° C. for 504 hours, elongation was measured by the method mentioned above in (1) for normal physical properties. The change in % of the elongation after the oil immersion from that in (1) was determined, so that oil resistance was evaluated.

(5) Cold Resistance

Cold resistance was evaluated by Gehman torsion test according to JIS K 6261 to measure temperature (T10) at which the torsion angle became 10 times of the torsion angle at lower temperature (23° C.). It was assessed that the lower T10 is, the superior in cold resistance is.

(6) Ozone Resistance (Static Ozone Test)

A vulcanizable nitrile group-containing copolymer rubber composition was press molded at 160° C. for 20 minutes, and crosslinked to obtain a sheet with a thickness of 2 mm, a length of 150 mm and a width of 150 mm, so that a specimen (a test sheet) was obtained.

Then, the obtained specimen was held stretched 15% at 40° C. under ozone concentration of 50 pphm according to JIS K 6259, and its state after 24 hours was observed with a magnifying glass of 10-fold, so that ozone resistance was evaluated by existence of cracks.

Example of Production 1,3-butadiene, acrylonitrile and in accordance with need, butyl acrylate or 2-ethylhexyl acrylate were used to prepare two types of butadiene-acrylonitrile copolymer rubbers, nine types of butadiene-acrylonitrile-butyl acrylate ternary copolymer rubbers and one type of butadiene-acrylonitrile-2-ethylhexyl acrylate ternary copolymer rubber by normal emulsion polymerization in a reactor. Note that, in each of the above rubbers, the amount of each monomer was adjusted so that copolymer composition of each monomer (for 1,3-butadiene, a total ratio of saturated and unsaturated compounds) was the ratio described in Table 1.

Then, each of the obtained rubbers was separately dissolved in methyl isobutyl ketone, and a butadiene unit portion in each rubber was partially hydrogenated by using a palladium/silica catalyst in a pressure vessel to obtain a highly saturated copolymer rubber. By changing the amount of the hydrogenating catalyst and reaction time to control a degree of hydrogenation at hydrogenation reaction, the content ratio of each unit (a), (b), (c) and (d), and the values of "x" [i.e., (c)/{(c)+(d)}] and "x·A" [A is a content ratio of the unit (a)] were adjusted. The content ratios of the respective units and the values "x" and "x·A" are shown in Table 1.

Examples 1 to 5, Comparative Examples 1 to 7

100 parts of a nitrile group-containing copolymer rubber shown in Table 1, 60 parts of SRF carbon black (Seast S, made by Tokai Carbon Co., Ltd.), 10 parts of zinc oxide (zinc white No. 1), 8 parts of tri(2-ethylhexyl) trimellitate as a plasticizer, and 1.5 parts of 4,4'-bis(α,α-dimethylbenzyl)diphenylamine and 1.5 parts of 2-mercaptobenzimidazole zinc salt as antioxidants were mixed in a Bambury mixer at 50° C., and placed in an open roll. After adding 40% product of 1,3-bis (tert-butyl-peroxyisopropyl)benzene (Vul-Cup 40KE, made by GEO Specialty Chemicals Inc.) as an organic peroxide in an amount of 6 parts, the mixture was kneaded at 50° C. for 10 minutes to obtain a vulcanizable nitrile group-containing copolymer rubber composition. Using the obtained composition, a vulcanized specimen for each test was produced, and normal physical properties, heat aging resistance, oil resistance, cold resistance and ozone resistance were tested and evaluated. The results are shown in Table 1.

TABLE 1

|   |   |   |   | Example | | | | | Comparative Example |
|---|---|---|---|---|---|---|---|---|---|
|   |   |   |   | 1 | 2 | 3 | 4 | 5 | 1 |
|   |   |   | Copolymer Composition | | | | | | |
| (a) | Acrylonitrile Unit | Content Ratio | A(%) | 27 | 22 | 20 | 18 | 35 | 45 |
| (b) | α, β-Ethylenic Unsaturated Carboxylic Acid Ester Unit | Monomer | | Butyl Acrylate | 2-Ethylhexyl Acrylate | Butyl Acrylate | Butyl Acrylate | Butyl Acrylate | — |
|   |   | Content Ratio | (%) | 28 | 32 | 35 | 37 | 10 | 0 |
| (c) | 1,3-Butadiene Unit | Content Ratio | (%) | 1 | 3 | 2 | 3 | 1 | 1 |
| (d) | Saturated 1,3-Butadiene Unit | Content Ratio | (%) | 44 | 43 | 43 | 42 | 54 | 54 |
|   | (c) + (d) |   | (%) | 45 | 46 | 45 | 45 | 55 | 55 |
|   | (c)/[(c) + (d)] |   | x | 0.0222 | 0.0652 | 0.0444 | 0.0666 | 0.0182 | 0.018 |
|   | x · A |   | (%) | 0.6 | 1.43 | 0.89 | 1.2 | 0.637 | 0.82 |
|   |   |   | Test & Evaluation | | | | | | |
| Normal Physical Properties | Tensile Strength | (MPa) | | 17.6 | 17.4 | 16.3 | 16.5 | 18.2 | 19.6 |
|   | Elongation | (%) | | 280 | 350 | 340 | 340 | 380 | 470 |
|   | Hardness | (Duro A) | | 65 | 64 | 61 | 60 | 69 | 73 |
| Heat Aging Resistance | Change Rate of the Elongation | (%) | | −7 | −26 | −15 | −26 | −24 | −45 |
| Oil Resistance | Change Rate of the Elongation | (%) | | −21 | −29 | −18 | −24 | −29 | −47 |
| Cold Resistance | T10 | (° C.) | | −37 | −38 | −39 | −39 | −32 | −22 |
| Ozone Resistance | Existence of Cracks | | | None | None | None | None | None | None |

|   |   |   |   | Comparative Example | | | | | |
|---|---|---|---|---|---|---|---|---|---|
|   |   |   |   | 2 | 3 | 4 | 5 | 6 | 7 |
|   |   |   | Copolymer Composition | | | | | | |
| (a) | Acrylonitrile Unit | Content Ratio | A(%) | 38 | 35 | 22 | 45 | 5 | 20 |
| (b) | α, β-Ethylenic Unsaturated Carboxylic Acid Ester Unit | Monomer | | Butyl Acrylate | — | Butyl Acrylate | Butyl Acrylate | Butyl Acrylate | Butyl Acrylate |
|   |   | Content Ratio | (%) | 12 | 0 | 30 | 15 | 35 | 5 |
| (c) | 1,3-Butadiene Unit | Content Ratio | (%) | 4 | 6 | 5 | 1 | 6 | 5 |
| (d) | Saturated 1,3-Butadiene Unit | Content Ratio | (%) | 46 | 59 | 43 | 39 | 54 | 70 |
|   | (c) + (d) |   | (%) | 50 | 65 | 48 | 40 | 60 | 75 |
|   | (c)/[(c) + (d)] |   | x | 0.08 | 0.092 | 0.104 | 0.025 | 0.1 | 0.0666 |

TABLE 1-continued

| x · A | (%) | 3.04 | 3.23 | 2.29 | 1.13 | 0.5 | 1.33 |
|---|---|---|---|---|---|---|---|
| | | Test & Evaluation | | | | | |
| Normal Physical Properties | Tensile Strength (MPa) | 18.2 | 20.1 | 16.0 | 15.9 | 16.8 | 19.2 |
| | Elongation (%) | 350 | 350 | 300 | 380 | 360 | 400 |
| | Hardness (Duro A) | 70 | 70 | 61 | 72 | 62 | 63 |
| Heat Aging Resistance | Change Rate of the Elongation (%) | −46 | −63 | −43 | −37 | −36 | −40 |
| Oil Resistance | Change Rate of the Elongation (%) | −51 | −77 | −40 | −42 | −33 | −43 |
| Cold Resistance | T10 (° C.) | −29 | −30 | −39 | −21 | −41 | −32 |
| Ozone Resistance | Existence of Cracks | None | Present | Present | None | Present | None |

As shown in Table 1, the rubber vulcanizates obtained by vulcanizing the nitrile group-containing copolymer rubber, satisfying requirements of the present invention, by the organic peroxide were superior in a balance of tensile strength, elongation and hardness in the normal state, smaller reduction in elongation as a result of the hot-air aging test and oil immersion (superior in heat aging resistance and oil resistance), and also superior in cold resistance and ozone resistance (Examples 1 to 5).

On the other hand, the rubber vulcanizate having too large content ratio "A" of α,β-ethylenically unsaturated nitrile unit (a) showed lower tensile strength in the normal state, larger reduction in elongation as a result of the hot-air aging test and engine oil immersion (inferior in heat aging resistance and oil resistance), and inferior in cold resistance (Comparative Example 5). In contrast, the rubber vulcanizate having too small content ratio "A" of α,β-ethylenically unsaturated nitrile unit (a) was inferior in heat aging resistance, oil resistance and ozone resistance (Comparative Example 6).

The rubber vulcanizates having no α,β-ethylenically unsaturated carboxylic acid ester unit (b) were inferior in heat aging resistance, oil resistance and cold resistance (Comparative Examples 1 and 3). The rubber vulcanizate, wherein the total content ratio of conjugated diene unit (c) and saturated conjugated diene unit (d) was too large, was inferior in heat aging resistance and oil resistance (Comparative Example 7).

When the content ratio "x" of conjugated diene unit (c) to the total content of conjugated diene unit (c) and saturated conjugated diene unit (d) was too large, the resulting vulcanizate was inferior in heat aging resistance, oil resistance and ozone resistance (Comparative Example 4). When the value of "x·A" was too large, the resulting vulcanizate had lower heat aging resistance, oil resistance and cold resistance (Comparative Example 2).

The invention claimed is:

1. A nitrile group-containing copolymer rubber comprising 10 to 40 wt % of an α,β-ethylenically unsaturated nitrile unit (a), 10 to 60 wt % of an α,β-ethylenically unsaturated carboxylic acid ester unit (b), and 20 to 70 wt % in total of a conjugated diene unit (c) and a saturated conjugated diene unit (d), wherein the wt % of (a) through (d) is based on a total weight of the nitrile group-containing copolymer rubber, and wherein
a content ratio "x" is 0.08 or smaller, and wherein "x" is defined as a ratio of a content of the conjugated diene unit (c) to a sum of a content of the conjugated diene unit (c) and the content of the saturated conjugated diene unit (d); and wherein
"x·A" is 1.5 or smaller, wherein "x·A" is defined as a product of said ratio "x" and "A" wherein "A" is a wt % of said α,β-ethylenically unsaturated nitrile unit (a).

2. The nitrile group-containing copolymer rubber as set forth in claim 1, wherein a monomer forming said α,β-ethylenically unsaturated nitrile unit (a) is acrylonitrile and/or methacrylonitrile.

3. The nitrile group-containing copolymer rubber as set forth in claim 1 or 2, wherein a monomer forming said α,β-ethylenically unsaturated carboxylic acid ester unit (b) is butyl acrylate and/or 2-ethylhexyl acrylate.

4. The nitrile group-containing copolymer rubber as set forth in either claim 1 or claim 2, wherein a monomer forming said conjugated diene unit (c) is 1,3-butadiene.

5. The nitrile group-containing copolymer rubber as set forth in claim 4, wherein said saturated conjugated diene unit (d) is a monomer unit formed by hydrogenating said 1,3-butadiene.

6. A vulcanizable nitrile group-containing copolymer rubber composition comprising the nitrile group-containing copolymer rubber as set forth in claim 1 and a vulcanizing agent.

7. The vulcanizable nitrile group-containing copolymer rubber composition as set forth in claim 6, wherein a content of said vulcanizing agent is 0.1 to 10 parts by weight based on 100 parts by weight of said nitrile group-containing copolymer rubber.

8. The vulcanizable nitrile group-containing copolymer rubber composition as set forth in claim 6 or 7, wherein said vulcanizing agent is an organic peroxide.

9. A rubber vulcanizate formed by vulcanizing the vulcanizable nitrile group-containing copolymer rubber composition as set forth in claim 6.

10. The nitrile group-containing copolymer rubber as set forth in claim 1, wherein the ratio "x" is 0.07 or smaller.

11. The nitrile group-containing copolymer rubber as set forth in claim 1, wherein the ratio "x" is 0.07 or smaller and "x·A" is 1.4 or smaller.

12. The nitrile group-containing copolymer rubber as set forth in claim 1, wherein the ratio "x" is 0.05 or smaller and "x·A" is 1.1 or smaller.

* * * * *